(12) United States Patent
Fan et al.

(10) Patent No.: US 11,718,888 B2
(45) Date of Patent: Aug. 8, 2023

(54) METHOD FOR PRODUCING A HIGH STRENGTH COATED STEEL SHEET HAVING IMPROVED STRENGTH, FORMABILITY AND OBTAINED SHEET

(71) Applicant: ArcelorMittal, Luxembourg (LU)

(72) Inventors: Dongwei Fan, East Chicago, IN (US); Hyun Jo Jun, East Chicago, IN (US); Rashmi Mohanty, East Chicago, IN (US); Pavan K. C. Venkatasurya, East Chicago, IN (US)

(73) Assignee: ARCELORMITTAL, Luxembourg (LU)

( * ) Notice: Subject to any disclaimer, the term of this patent is extended or adjusted under 35 U.S.C. 154(b) by 475 days.

(21) Appl. No.: 16/827,696

(22) Filed: Mar. 23, 2020

(65) Prior Publication Data

US 2020/0224287 A1    Jul. 16, 2020

Related U.S. Application Data

(62) Division of application No. 15/322,789, filed as application No. PCT/IB2015/055041 on Jul. 3, 2015, now Pat. No. 10,907,232.

(51) Int. Cl.
*C21D 9/46* (2006.01)
*C22C 38/04* (2006.01)
(Continued)

(52) U.S. Cl.
CPC .................. *C21D 9/46* (2013.01); *C21D 1/18* (2013.01); *C21D 6/005* (2013.01); *C21D 6/008* (2013.01);
(Continued)

(58) Field of Classification Search
CPC ................ C21D 1/18; C21D 2211/001; C21D 2211/002; C21D 2211/008; C21D 6/005;
(Continued)

(56) References Cited

U.S. PATENT DOCUMENTS

| 6,743,307 B1 | 6/2004 | Engl et al. |
| 7,976,647 B2 | 7/2011 | Moulin et al. |

(Continued)

FOREIGN PATENT DOCUMENTS

| CN | 1386903 A | 12/2002 |
| CN | 1990894 A | 7/2007 |

(Continued)

OTHER PUBLICATIONS

C. Garcia-Mateo et al.: "On Measurement of Carbon Content in Retained Austenite in a Nanostructured Baintic Steel", Springer Science and Business Media LLC 2011, pp. 1-7.
(Continued)

*Primary Examiner* — Lois L Zheng
(74) *Attorney, Agent, or Firm* — Davidson, Davidson & Kappel, LLC

(57) ABSTRACT

A method is for producing a high strength coated steel sheet having an improved ductility and an improved formability, and a chemical composition containing: 0.13%≤C≤0.22%, 1.9%≤Si≤2.3%, 2.4%≤Mn≤3%, Al≤0.5%, Ti≤0.05%, Nb≤0.05%, the remainder being Fe and unavoidable impurities. The sheet is annealed at temperature TA higher than Ac3 but less than 1000° C. for a time of more than 30 s, quenched by cooling to a quenching temperature QT between 200° C. and 280° C. in order to obtain a structure consisting of austenite and at least 50% of martensite, the austenite content being such that the final structure can contain between 3% and 15% of residual austenite and between 85% and 97% of the sum of martensite and bainite, without ferrite, heated up to a partitioning temperature PT between 430° C. and 490° C. and maintained at this temperature for a time Pt between 10 s and 100 s, hot dip coated and cooled to the room temperature.

9 Claims, 1 Drawing Sheet

(51) Int. Cl.

| | |
|---|---|
| *C22C 38/02* | (2006.01) |
| *C21D 8/02* | (2006.01) |
| *C21D 1/18* | (2006.01) |
| *C21D 6/00* | (2006.01) |
| *C22C 38/06* | (2006.01) |
| *C22C 38/12* | (2006.01) |
| *C22C 38/14* | (2006.01) |
| *C23C 2/06* | (2006.01) |
| *C23C 2/28* | (2006.01) |
| *C23C 2/40* | (2006.01) |
| *C21D 9/00* | (2006.01) |
| *C21D 8/00* | (2006.01) |

(52) U.S. Cl.
CPC ......... *C21D 8/0205* (2013.01); *C21D 8/0226* (2013.01); *C21D 8/0236* (2013.01); *C21D 8/0247* (2013.01); *C22C 38/02* (2013.01); *C22C 38/04* (2013.01); *C22C 38/06* (2013.01); *C22C 38/12* (2013.01); *C22C 38/14* (2013.01); *C23C 2/06* (2013.01); *C23C 2/285* (2013.01); *C23C 2/40* (2013.01); *C21D 8/02* (2013.01); *C21D 2211/001* (2013.01); *C21D 2211/002* (2013.01); *C21D 2211/008* (2013.01)

(58) Field of Classification Search
CPC ........ C21D 6/008; C21D 8/02; C21D 8/0205; C21D 8/0226; C21D 8/0236; C21D 8/0247; C22C 38/04; C22C 38/05; C22C 38/06; C22C 38/12; C22C 38/14; C23C 2/06; C23C 2/285; C23C 2/40
See application file for complete search history.

(56) References Cited

U.S. PATENT DOCUMENTS

| | | |
|---|---|---|
| 2002/0197505 A1 | 12/2002 | Shigekuni et al. |
| 2010/0307644 A1 | 12/2010 | Gil Otin et al. |
| 2011/0146852 A1 | 6/2011 | Matsuda et al. |
| 2011/0186189 A1 | 8/2011 | Futamura |
| 2011/0198002 A1 | 8/2011 | Nakagaito |
| 2012/0031528 A1 | 2/2012 | Hayashi et al. |
| 2012/0312433 A1 | 12/2012 | Mizuta et al. |
| 2013/0167980 A1 | 7/2013 | Kawata et al. |
| 2014/0322559 A1 | 10/2014 | Becker et al. |
| 2015/0086808 A1 | 3/2015 | Kasuya et al. |
| 2015/0203947 A1 | 7/2015 | Hasegawa et al. |
| 2019/0003007 A1 | 1/2019 | Venkatasurya et al. |

FOREIGN PATENT DOCUMENTS

| | | |
|---|---|---|
| CN | 102149841 A | 8/2011 |
| EP | 1676932 A1 | 7/2006 |
| EP | 1990431 A1 | 11/2008 |
| EP | 2267176 A1 | 12/2010 |
| EP | 2325346 A1 | 5/2011 |
| EP | 2524970 A1 | 11/2012 |
| EP | 2757171 A1 | 7/2014 |
| EP | 2881481 A1 | 6/2015 |
| JP | 2001192768 | 7/2001 |
| JP | 2006083403 A | 3/2006 |
| JP | 2007231311 | 9/2007 |
| JP | 2010090450 A | 4/2010 |
| JP | 2010126770 A | 6/2010 |
| JP | 2012021225 A | 2/2012 |
| JP | 2012229466 A | 11/2012 |
| JP | 2012240095 A | 12/2012 |
| JP | 2013014828 A | 1/2013 |
| JP | 2013019047 A | 1/2013 |
| JP | 2014009388 A | 1/2014 |
| JP | 2014019928 A | 2/2014 |
| JP | 2015224359 A | 12/2015 |
| RU | 2321667 C2 | 4/2008 |
| RU | 2485202 C1 | 6/2013 |
| RU | 2524743 C2 | 8/2014 |
| WO | WO0109396 A1 | 2/2001 |
| WO | WO2004022794 A1 | 3/2004 |
| WO | WO2012036269 A1 | 3/2012 |
| WO | WO2013146148 A1 | 10/2013 |
| WO | WO 2014020640 A1 | 2/2014 |

OTHER PUBLICATIONS

C.P. Scott et al. "A Study of the Carbon Distribution in Retained Austenite", Sciencedirect.com 2006, pp. 1-4.

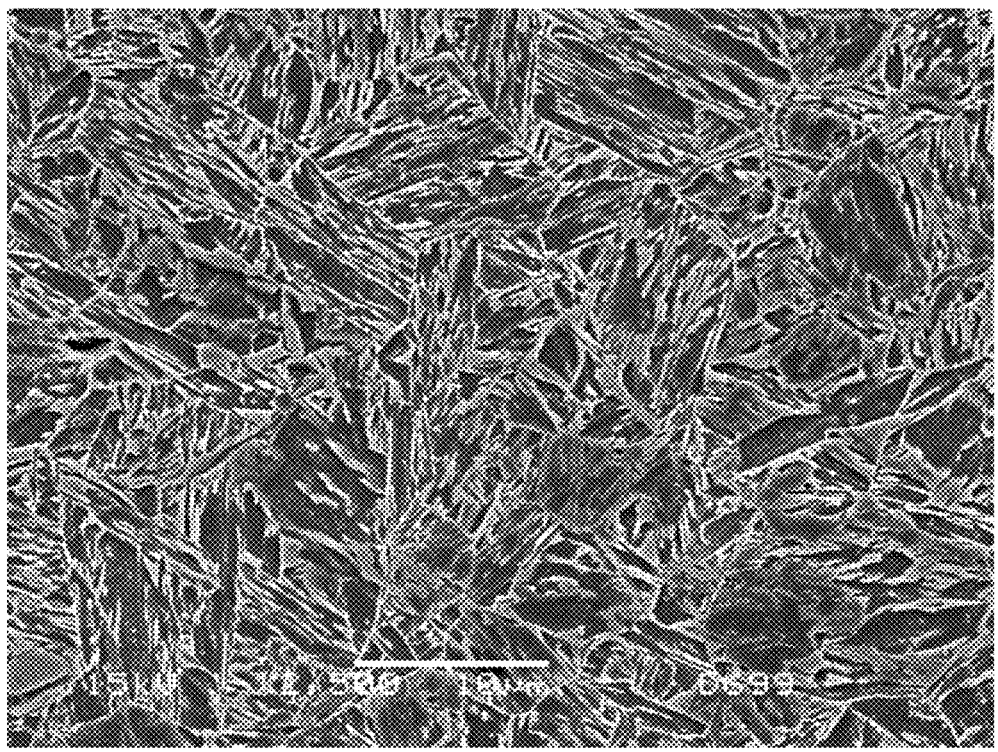

METHOD FOR PRODUCING A HIGH STRENGTH COATED STEEL SHEET HAVING IMPROVED STRENGTH, FORMABILITY AND OBTAINED SHEET

This is a Divisional of U.S. patent application Ser. No. 15/322,789, filed Dec. 29, 2016 which is a National Phase of International Patent Application PCT/IB2015/055041, filed Jul. 3, 2015 claiming priority of International Patent Application PCT/IB2014/002392, filed Jul. 3, 2014, the entire disclosures of which are hereby incorporated by reference herein.

The present invention relates to a method for producing a high strength coated steel sheet having improved strength, ductility and formability and to the sheets obtained with the method.

BACKGROUND

To manufacture various equipments such as parts of body structural members and body panels for automotive vehicles, it is usual to use galvanized or galvannealed sheets made of DP (dual phase) steels or TRIP (transformation induced plasticity) steels.

For example, such steels which have include a martensitic structure and/or retained austenite and which contains about 0.2% of C, about 2% of Mn, about 1.7% of Si have a yield strength of about 750 MPa, a tensile strength of about 980 MPa, a total elongation of more than 8%. These sheets are produced on continuous annealing line by quenching from an annealing temperature higher than $Ac_3$ transformation point, down to an overaging above Ms transformation point and maintaining the sheet at the temperature for a given time. Then the sheet is galvanized or galvannealed.

SUMMARY

To reduce the weight of the automotive in order to improve their fuel efficiency in view of the global environmental conservation it is desirable to have sheets having improved yield and tensile strength. But such sheets must also have a good ductility and a good formability and more specifically a good stretch flangeability.

In this respect, it is desirable to have sheets having a yield strength YS of at least 800 MPa, a tensile strength TS of about 1180 MPa, a total elongation of at least 14% and a hole expansion ratio HER according to ISO standard 16630:2009 of more than 25%, and even of more than 30%. It must be emphasized that, due to differences in the methods of measure, the values of hole expansion ration HER according to the ISO standard are very different and not comparable to the values of the hole expansion ratio λ according to the JFS T 1001 (Japan Iron and Steel Federation standard).

For this purpose, a method is provided for producing a high strength coated steel sheet having an improved ductility and an improved formability, the sheet having a yield strength YS of at least 800 MPa, a tensile strength TS of at least 1180 MPa, a total elongation of at least 14% and a hole expansion ratio HER measured according to the ISO standard of at least 30%, by heat treating and coating a steel sheet wherein the chemical composition of the steel contains:

0.13%≤C≤0.22%

1.9%≤Si≤2.3%

2.4%≤Mn≤3%

Al≤0.5%

Ti≤0.05%

Nb≤0.05% the remainder being Fe and unavoidable impurities, the heat treatment and the coating comprise the following steps:

annealing the sheet at an annealing temperature TA higher than Ac3 but less than 1000° C. for a time of more than 30 s, quenching the sheet by cooling it down to a quenching temperature QT between 200° C. and 280° C., at a cooling speed sufficient to obtain a structure consisting of austenite and at least 50% of martensite, the austenite content being such that the final structure i.e. after treatment, coating and cooling to the room temperature, can contain between 3% and 15% of residual austenite and between 85% and 97% of the sum of martensite and bainite, without ferrite, heating the sheet up to a partitioning temperature PT between 430° C. and 490° C. and maintaining the sheet at this temperature for a partitioning time Pt between 10 s and 100 s, this step being a partitioning step, hot dip coating the sheet and, cooling the sheet down to the room temperature.

Preferably, the partitioning temperature PT can satisfies at least one of the following conditions: PT≥455° C. and PT≤485° C.

During partitioning the temperature of the sheet may remain between PT−20° C. and PT+20° C. or linearly decreases from the temperature of reheating to a temperature between 455° C. and 465° C.

Preferably, the chemical composition of the steel can satisfy at least one of the following conditions: C≥0.16%, C≤0.20%, Si≥2.0%, Si≤2.2%, Mn≥2.6%, and Mn≤2.8%.

Preferably, after the sheet is quenched to the quenching temperature QT and before the sheet is heated to the partitioning temperature PT, the sheet is held at the quenching temperature QT for a holding time comprised between 2 s and 8 s, preferably between 3 s and 7 s.

Preferably, the annealing temperature is higher than Ac3+15° C., in particular higher than 875° C.

Preferably, the hot dip coating step is a galvanizing step or a galvannealing step with an alloying temperature TGA between 490° C. and 530° C. or satisfying at least one of the following conditions, TGA>515° C. and TGA<525° C.

Preferably, the partitioning time Pt is between 10 and 90 s.

A coated steel sheet is also provided whose chemical composition of the steel contains in weight %:

0.13%≤C≤0.22%

1.9%≤Si≤2.3%

2.4%≤Mn≤3%

Al≤0.5%

Ti≤0.05%

Nb≤0.05% the remainder being Fe and unavoidable impurities. The structure of the steel consists of 3% to 15% of residual austenite and between 85% and 97% of the sum of martensite and bainite, without ferrite. At least one face of the sheet comprises a metallic coating. The sheet has a yield strength of at least 800 MPa, a tensile strength of at least 1180 MPa, a total elongation of at least 14% and a hole expansion ratio HER of at least 30%. The hole expansion ratio HER may even be greater than 40%.

Optionally, the chemical composition of the steel may satisfy at least one of the following conditions:

C≥0.16%

C≤0.20%

Si≥2.0%

Si≤2.2%

Mn≥2.6% and

Mn≤2.8%.

Preferably the at least one coated face is galvanized or galvannealed.

Preferably, the C content in the retained austenite is of at least 0.9%, still preferably of at least 1.0%, and up to 1.6%.

The average austenitic grain size, i.e. the average grain size of the retained austenite, is preferably of 5 μm or less.

The average size of the grains or blocks of martensite and bainite is preferably of 10 μm or less.

BRIEF SUMMARY OF THE DRAWING

Embodiments of invention will now be described in details but without introducing limitations and illustrated by the unique FIGURE which is illustrative of example 1 according to an embodiment of the invention.

DETAILED DESCRIPTION

The sheet is obtained by hot rolling and optionally cold rolling of a semi product made of TRIP or dual steel which chemical composition contains, in weight %:

0.13 to 0.22%, and preferably more than 0.16% preferably less than 0.20% of carbon for ensuring a satisfactory strength and improving the stability of the retained austenite which is necessary to obtain a sufficient elongation. If carbon content is too high, the hot rolled sheet is too hard to cold roll and the weldability is insufficient.

1.9% to 2.3% preferably more than 2% and less than 2.2% of silicon in order to stabilize the austenite, to provide a solid solution strengthening and to delay the formation of carbides during overaging without formation of silicon oxides at the surface of the sheet which is detrimental to coatability. An increased amount of Si improves the hole expansion ratio and allows higher galvannealing temperatures to be reached without being detrimental to steel bulk microstructure by delaying carbides formation 2.4% to 3% and preferably more than 2.6% and preferably less than 2.8% of manganese to have a sufficient hardenability in order to obtain a structure containing at least 85% of martensite or martensite and bainite, the martensite is preferred but it is often difficult to distinguish martensite and bainite by optical micrography, tensile strength of more than 1150 MPa and to avoid having segregation issues which are detrimental for the ductility. Moreover, 2.4% to 3% Mn can stabilize austenite during galvannealing.

up to 0.5% of aluminium which is usually added to liquid steel for the purpose of deoxidation, preferably, the Al content is limited to 0.05. If the content of Al is above 0.5%, the austenitizing temperature will be too high to reach and the steel will become industrially difficult to process.

Nb content is limited to 0.05% because above such value large precipitates will form and formability will decrease, making the 14% of total elongation more difficult to reach.

Ti content is limited to 0.05% because above such value large precipitates will form and formability will decrease, making the 14% of total elongation more difficult to reach.

The remainder is iron and residual elements resulting from the steelmaking. In this respect, Ni, Cr, Mo, Cu, V, B, S, P and N at least are considered as residual elements which are unavoidable impurities. Therefore, their contents are less than 0.05% for Ni, 0.05% for Cr, 0.02% for Mo, 0.03% for Cu, 0.007% for V, 0.0010% for B, 0.007% for S, 0.02% for P and 0.010% for N.

The sheet is prepared by hot rolling and optionally cold rolling according to the methods known by those which are skilled in the art.

After rolling the sheets are pickled or cleaned then heat treated and hot dip coated.

The heat treatment which is made preferably on a combined continuous annealing and hot dip coating line comprises the steps of:

annealing the sheet at an annealing temperature TA higher than the $Ac_3$ transformation point of the steel, and preferably higher than $Ac_3$+15° C. i.e. higher than 875° C., in order to be sure that the structure is completely austenitic, but less than 1000° C. in order not to coarsen too much the austenitic grains. The sheet is maintained at the annealing temperature i.e. maintained between TA−5° C. and TA+10° C., for a time sufficient to homogenize the chemical composition. This time is preferably of more than 60 s but does not need to be of more than 300 s.

quenching the sheet by cooling down to a quenching temperature QT lower than the Ms transformation point at a cooling rate enough to avoid ferrite formation, i.e. to have a ferrite free structure. The quenching temperature is between 200° C. and 280° C. in order to have a structure containing between 3% and 15% of residual austenite and between 85% and 97% of the sum of martensite and bainite. In particular, quenching the sheet to a quenching temperature comprised between 200° C. and 280° C. is critical to obtain a tensile strength of at least 1180 MPa, a total elongation of at least 14% and a hole expansion ratio HER according to ISO standard 16630:2009 of more than 30%. Especially, the inventors have discovered that a quenching temperature of more than 280° C. leads to a significant decrease in the total elongation and the hole expansion ratio, below the targeted values. As previously said, martensite is preferred, but martensite and bainite are often difficult to be distinguished. But, as the quenching temperature is lower than Ms, the structure necessarily contains martensite. Due to the tensile strength which is obtained, the amount of martensite in the final structure can be estimated at more than 50%. A cooling rate higher than 30° C./s is enough.

reheating the sheet from the quenching temperature up to a partitioning temperature PT between 430° C. and 490° C. and preferably between 455° C. and 485° C. For example, the partitioning temperature can be equal to the temperature at which the sheet must be heated in order to be hot dip coated, i.e. between 455° C. and 465° C. The reheating rate can be high when the reheating is made by induction heater, but that reheating rate had no apparent effect on the final properties of the sheet. Preferably, between the quenching step and the step of reheating the sheet to the partitioning temperature PT, the sheet is held at the quenching temperature for a holding time comprised between 2 s and 8 s, preferably between 3 s and 7 s.

maintaining the sheet at the partitioning temperature PT for a time between 10 s and 100 s, for example 90 s. Maintaining the sheet at the partitioning temperature means that during partitioning the temperature of the sheet remains between PT−20° C. and PT+20° C. or the temperature linearly decreases from the temperature of reheating to a temperature between 455° C. and 465° C.

optionally, adjusting the temperature of the sheet by cooling or heating in order to be equal to the temperature at which the sheet has to be heated in order to be hot dip coated, hot dip coating the sheet by galvanizing it or by galvannealing it. When the sheet is galvanized, it is done with the usual conditions. When the sheet is galvannealed, the temperature of alliation TGA must not be too high to obtain good final mechanical properties. This temperature is preferably between 490° and 530° C. and preferably between 515° C. and 525° C.

Generally, after coating, the sheet is processed according to the known art. In particular the sheet is cooled to the room temperature at a cooling speed preferably higher than 1° C./s, currently between 2° C./s and 4° C./s.

This treatment allows obtaining a final structure i.e. after partitioning, coating and cooling to the room temperature, containing between 3% and 15% of residual austenite and between 85% and 97% of the sum of martensite and bainite, without ferrite.

Furthermore, this treatment allows obtaining an increased C content in the retained austenite, which is of at least 0.9%, preferably even of at least 1.0%, and up to 1.6%.

Moreover, the average austenitic grain size is preferably of 5 μm or less, and the average size of the blocks of bainite or martensite is preferably of 10 μm or less.

The amount of retained austenite is for example of at least 11%.

With such treatment, coated sheets having a yield strength YS of at least 800 MPa, a tensile strength of at least 1180 MPa, a total elongation of at least 14% and a hole expansion ratio HER according to the ISO standard 16630:2009 of at least 30% can be obtained.

As an example a sheet of 1.2 mm in thickness having the following composition:

C=0.19%, Si=2.1% Mn=2.7%, the remainder being Fe and impurities, was manufactured by hot and cold rolling. The theoretical Ms Transformation point (according to Andrews's formula) of this steel is 363° C. and the $Ac_3$ point measured by experimental methods is 856° C.

Samples of the sheet were heat treated by annealing at 880° C., quenching down to quenching temperatures of 250° C., 300° C. and 350° C., and partitioning by heating up to 480° C. and linear decreasing of the temperature down to 460° C. Then, they were galvannealed with an alloying at 520° C., 550° C. or 570° C.

The heat treatment conditions and the obtained properties are reported in table I.

TABLE I

| Example | AT °C. | QT °C. | PT °C. | Pts | Coating | YS MPa | TS MPa | UE % | TE % | HER % | RA % | RA grain size μm | C % in RA % | BM grain size μm |
|---|---|---|---|---|---|---|---|---|---|---|---|---|---|---|
| 1 | 880 | 250 | 480–460 | 30 | GA, 520° C. | 940 | 1210 | 10 | 14 | 50 | 12.1 | ≤5 | 1.1 | ≤10 |
| 2 | | | | 30 | GA, 550° C. | 854 | 1141 | 7 | 9 | | | | | |
| 3 | | | | 30 | GA, | 851 | 1127 | 8 | 11 | | | | | |
| 4 | | | | 60 | 570° C. | 861 | 1107 | 6 | 7 | | | | | |
| 5 | | 300 | | 30 | GA, | 708 | 1180 | 10 | 15 | | | | | |
| 6 | | | | 60 | 570° C. | 691 | 1171 | 7 | 7 | | | | | |
| 7 | | 350 | | 30 | GA, | 934 | 1403 | 4 | 4 | | | | | |
| 8 | | | | 60 | 570° C. | 870 | 1398 | 6 | 6 | | | | | |

In this table, AT is the annealing temperature, QT the quenching temperature, PT the partitioning temperature, Pt the maintaining time at the partitioning temperature, GA refers to galvannealing and is associated with the alloying temperature, YS the yield strength, TS the tensile strength, UE the uniform elongation, TE the total elongation and HER the hole expansion ratio measured according to the ISO standard. RA % is the amount of retained austenite in the microstructure, RA grain size is the average austenite grain size, C % in RA is the C content in the retained austenite, and BM grain size is the average size of the grains or blocks of martensite and bainite.

All examples are related to sheets that were galvannealed. Only the example 1 satisfies the required conditions for the properties. For the others (examples 2 to 8) the ductility is not sufficient except for example 5 which does not present enough yield strength. These results show that a quenching temperature of 300° C. or 350° C. does not provide a satisfactory result. When the quenching temperature is 250° C., if the alloying temperature is 550° C. or 570° C., the results are not satisfactory either.

Tests performed on the steel sheets according to embodiments of the invention showed that the weldability of the sheets is satisfactory. In particular, welding tests performed on welded sheets according to embodiments of the invention showed a cross section strength of about 6 kN, which can be improved up to about 12 kN after a post welding heat treatment is performed. The tensile shear strength was measured at about 25 kN.

What is claimed is:

1. A coated steel sheet comprising:
a chemical composition of the steel including in weight %:

0.13%≤C≤0.22%;

2.0%≤Si≤2.2%;

2.4%≤Mn≤3%;

Al≤0.5%;

Ti≤0.05%; and

Nb≤0.05%;

a remainder being Fe and unavoidable impurities including Cr<0.05% and Mo<0.02%;
a structure comprising 3% to 15% of retained austenite and between 85% and 97% of a sum of martensite and bainite, the structure not including ferrite;
at least one face of the coated steel sheet including a metallic coating;
a yield strength of at least 800 MPa, a tensile strength of at least 1180 MPa, a total elongation of at least 14% and a hole expansion ratio HER of at least 30%, and
an average size of grains or blocks of martensite is of 10 μm or less and/or the average size of grains or blocks of bainite is of 10 μm or less.

2. The coated steel sheet according to claim 1, wherein the structure consists of 3% to 15% of retained austenite and between 85% and 97% of the sum of martensite and bainite.

3. The coated steel sheet according to claim 1, wherein the hole expansion ratio HER is greater than 40%.

4. The coated steel sheet according to claim 1, wherein the chemical composition of the steel satisfies at least one of the following conditions:

C>0.16%;

C<0.20%;

Si>2.0%;

Si<2.2%;

Mn>2.6%; and

Mn<2.8%.

5. The coated steel sheet according to claim 1, wherein the at least one face of the coated steel sheet is galvanized.

6. The coated steel sheet according to claim 1, wherein the at least one face of the coated steel sheet is galvannealed.

7. The coated steel sheet according to claim 1, wherein the retained austenite has a C content of at least 0.9%.

8. The coated steel sheet according to claim 7, wherein the C content is at least 1.0%.

9. The coated steel sheet according to claim 1, wherein the retained austenite has an average grain size of 5 μm or less.

* * * * *